United States Patent [19]

Scott et al.

[11] Patent Number: 4,978,647

[45] Date of Patent: Dec. 18, 1990

[54] GEL BEAD COMPOSITION FOR METAL ADSORPTION

[75] Inventors: Charles D. Scott; Charlene A. Woodward; Charles H. Byers, all of Oak Ridge, Tenn.

[73] Assignee: United States Department of Energy, Washington, D.C.

[21] Appl. No.: 333,064

[22] Filed: Apr. 4, 1989

[51] Int. Cl.5 .................. B01J 37/36; B01J 20/22; C12N 11/12; C12N 11/04

[52] U.S. Cl. .................................. 502/7; 210/681; 210/682; 435/117; 435/178; 502/403; 502/404

[58] Field of Search ................. 502/7, 401, 402, 403, 502/404; 435/178, 177; 430/251

[56] References Cited

U.S. PATENT DOCUMENTS 4,259,115  3/1981  Hanselman et al. ............... 430/247
4,393,136  7/1983  Cheetham ........................... 435/178

Primary Examiner—Paul E. Konopka
Attorney, Agent, or Firm—Katherine P. Lovingood; Stephen D. Hammel; William R. Moser

[57] ABSTRACT

The invention is a gel bead comprising propylene glycol alginate and bone gelatin and is capable of removing metals such as Sr and Cs from solution without adding other adsorbents. The invention could have application to the nuclear industry's waste removal activities.

3 Claims, No Drawings

GEL BEAD COMPOSITION FOR METAL ADSORPTION

This invention relates to gel beads used for adsorption of metals, particularly hazardous metals, such as radioactive strontium and cesium, found in nuclear facility waste waters. The invention was developed under a contract with the U.S. Department of Energy.

BACKGROUND OF THE INVENTION

Nuclear energy production processes have a major disadvantage of producing waste that has a high concentration of heavy and radioactive metals. Conventional methods for removing heavy metals from aqueous streams include chemical precipitation, chemical oxidation or reduction, ion exchange, filtration, electrochemical treatment, and evaporative recovery. These processes may be ineffective or extremely expensive when attempting to meet the concentration requirements of environmental regulations. Another method for removing these metals is absorption by microorganisms and some plant and animal tissues. The ability of biological tissue to interact with and concentrate a variety of metals is well known. Such interactions include those which are metabolically mediated or growth associated and the less specific absorptive complexation of metals with various cellular components. Although many microorganisms have been identified to absorb such metals, there is a continuing need to develop a processing system that is continuous and efficient and does not result in the loss of the microorganism as well as a system that does not require the use of live microorganisms during the extraction process.

SUMMARY OF THE INVENTION

In view of the above need, it is an object of this invention to provide a process for removing metals from aqueous streams in a continuous and efficient manner.

It is another object of this invention to provide a process for immobilizing microorganisms and/or plant and animal tissues to be used in a continuous extraction process of metals from waste streams.

Another objective is the use of various types of immobilized biological material either separately or in combination to remove dissolved metals from aqueous streams.

A further object of this invention is to provide a gel bead containing biological adsorbents that are capable of extracting metals from aqueous streams.

It is also an object of this invention to provide a gel bead that does not contain such microorganisms yet is still capable of extracting metals from aqueous streams. Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the above and other objects the invention is a gel bead comprising a mixture of propylene glycol alginate and bone gelatin, animal tissue. The bead may further comprise biological adsorbents contained within the bead that are capable of removing dissolved metals from aqueous streams. The invention is also a process for removing dissolved metals from aqueous streams by contacting the aqueous streams with the above described gel beads. Using the beads in the process simplifies the removal of metals from waste streams by permitting a continuous process without the need for biological adsorbents. For a more efficient process the beads may also contain other biological adsorbents.

DETAILED DESCRIPTION OF THE PREFERRED EMBODIMENT

The subject invention is a gelatinous bead composition for adsorbing dissolved metals and for immobilizing biocatalyst. It comprises a mixture of propylene glycol alginate (PGA) and bone gelatin which is conformed into congealed beads. The beads are prepared by dissolving 1 to 5 wt % PGA and 3 to 25 wt % deionized bone gelatin in water in the temperature range of 35°–65° C., cooling to just above the congealing temperature of from 30°–40° C., adding any desired constituents to be immobilized and forming beads.

To make the bead, the gelling mixture is subjected to a forced flow through a nozzle, preferably in conjunction with a vibrational force. The nozzle is positioned just above the surface of a column of cold (1°–10° C.) organic liquid that is immiscible and noninteracting with the aqueous phase droplets that enter. Alternatively, the nozzle is submerged in the cold organic liquid and the aqueous droplets are formed within the organic liquid at the nozzle tip. The organic liquid must have a specific gravity less than 1.0 since it is desirable for the aqueous-phase droplets to fall through the column by force of gravity. Liquids such as light mineral oil, hexane, other organic solvents immiscible in water, or mixtures of these substances are preferred. As the aqueous droplets contact the organic liquid, they are rapidly chilled to below the solidification temperature and they become spherical gel beads that are relatively stable solid particles as long as they remain below the solidification temperature.

In order to further stabilize the beads so they will remain a solid at higher temperatures and in other chemical environments, the chilled beads are allowed to fall through an interface between the column of organic liquid and a chilled (1°–20° C.) and stirred aqueous phase containing an alkaline chemical reactant that chemically crosslinks the PGA and gelatin into a stable structure. The alkaline chemicals of choice are NaOH and $Na_2CO_3$ dissolved at a concentration of 0.01N to 0.2N and contact time of 10–100 minutes is required with the longer periods producing greater bead stability. After this chemical crosslinking, the beads maintain their integrity for a long period of time at temperatures up to 100° C. and chemical environments encompassing a pH range of 2–10.

The procedure for immobilizing the microorganisms in the beads is to include the microorganisms in the gelling medium prior to bead formation. If live microorganisms or other fragile biological reagents are included in the gel matrix, it is important to use very mild chemical conditions in order to maintain viability. For this case, 0.1 N $Na_2CO_3$ at pH of approximately 10 should be used at a contact temperature of 1°–5° C. for a period of one hour. The low temperature is necessary to prevent loss of biological viability that might occur at high pH.

EXAMPLE 1

It was shown that the temperature of processing had a significant impact on the viability of included microorganisms. The bacteria *Zymomonas mobilis* in nutrient solution at a pH of 5.5 was subjected to a processing temperature in the range of 5°–60° C. for 30 min followed by incubation at 25° C. for 24 hours. As shown in Table 1 there is a significant advantage in processing at the lowest temperature of 5° C.

TABLE 1

| EFFECT OF TEMPERATURE ON BACTERIAL VIABILITY | |
|---|---|
| TEMPERATURE (° C.) | INCREASE IN CELL CONCENTRATION (24-HR CONCENTRATION/ INITIAL CONCENTRATION) |
| 5 | 124 |
| 25 | 84 |
| 40 | 78 |
| 60 | 5 |

EXAMPLE 2

The effect of processing pH on cell viability was also explored in the range of 7–13. The tests were again made with *Z. mobilis* in a nutrient solution subjected to a temperature of 5° C. for 30 min at a particular pH. Then the organisms were subjected to the nutrient solution at a pH of 5.5 for 24 hr. As shown in Table 2, there is a progressive decrease in cell viability as the pH increases, with an actual decrease in cell concentration at a pH of 13. Since a pH of at least 10 was required for the formation of a stable gel bead, this represents the optimum processing pH when live microorganisms are included.

TABLE 2

| EFFECT OF PROCESSING pH ON CELL VIABILITY | |
|---|---|
| pH | INCREASE IN CELL CONCENTRATION (24-HR CONCENTRATION/ INITIAL CONCENTRATION) |
| 7 | 124 |
| 10 | 13 |
| 13 | <1 |

EXAMPLE 3

Tests were also made on the effect of gel composition on bead stability. Of particular interest was dimensional stability when a concentrated salt solution was used instead of distilled water. The criteria for bead stability was the minimal reduction of bead diameter when subjected to 0.5M NaCl for 24 hr. As shown in Table 3, bead stability was affected by the concentration of either bone gelatin or PGA. The higher concentrations gave a more stable bead.

TABLE 3

| EFFECT OF GEL CONCENTRATION ON BEAD STABILITY | | |
|---|---|---|
| PGA Concentration (wt %) | Gelatin concentration (wt %) | % Diameter Reduction |
| 1 | 10 | 29 |
| 1 | 15 | 18 |
| 1 | 20 | 10 |
| 2 | 10 | 21 |
| 2 | 15 | 12 |
| 2 | 20 | 9 |

It was surprisingly discovered during experimentation that the gelatin beads themselves adsorb significant amounts of dissolved metals. This is especially true for the adsorption of Sr and, to a lesser degree, the adsorption of Cs. This phenomenon was uncovered during tests for microbial beads. Specific tests were then made.

EXAMPLE 4

Beads of nominal size of 4 mm-diam., made from 2% PGA and 15% bone gelatin (wt/vol), were added to shake flasks containing an aqueous solution of 10 ppm of chloride salts of Sr and Cs. The concentration of the metals was then determined by atomic absorption spectrometry at intervals during 48 hr of exposure. Distribution coefficients of the metals (concentration in bead phase/concentration in aqueous phase) were then determined.

As indicated in Table 4, the gel material had a significant affinity for Sr with a distribution coefficient greater than 1000 after 24 hr exposure. Even with Cs, the distribution coefficients were as high as 100. These results indicate that the gel material could well become an important industrial adsorbent for the isolation and concentration of certain dissolved metals.

TABLE 4

| ADSORPTION OF Sr AND Cs BY PGA-GELATIN BEADS | | |
|---|---|---|
| TIME (HR) | Sr DISTRIBUTION COEFFICIENT | Cs DISTRIBUTION COEFFICIENT |
| 4 | 134 | 87 |
| 24 | 1371 | 103 |
| 48 | 1318 | 97 |

EXAMPLE 5

Bioadsorbent beads formed from 2% PGA and 15% bone gelatin of a nominal 2 mm diameter were packed into a small column that was 1.5 cm diam×30 cm. An aqueous feed stream containing 100 ppm strontium chloride was pumped through the column at a rate of 0.2 mL/min. The effluent strontium concentration was found to be less than 50 ppb.

We claim:

1. A gel bead consisting essentially of a sufficient amount of water and propylene glycol alginate to allow for bead formation and a sufficient amount of bone gelatin to allow for metal absorption and chemically crosslinked in an alkaline medium to form a stable structure.

2. The gel bead of claim 1 wherein said propylene glycol alginate is present in a concentration of from 1 to 5 wt % and said bone gelatin is present in a concentration of from 3 to 25 wt %, and the balance is water.

3. A gel bead of claim 1 having contained therein a biological absorbent capable of removing metals from solution.

* * * * *